United States Patent
Widmer (10) Patent No.: US 9,559,540 B2
(45) Date of Patent: Jan. 31, 2017

(54) MOBILE TERMINAL WITH A RECHARGEABLE BATTERY AND METHOD FOR DISCHARGING THE RECHARGEABLE BATTERY

(71) Applicant: Meik Wilhelm Widmer, Elchingen (DE)

(72) Inventor: Meik Wilhelm Widmer, Elchingen (DE)

(73) Assignee: E. Solutions GmbH (DE)

( * ) Notice: Subject to any disclaimer, the term of this patent is extended or adjusted under 35 U.S.C. 154(b) by 0 days.

(21) Appl. No.: 14/733,613

(22) Filed: Jun. 8, 2015

(65) Prior Publication Data

US 2015/0364941 A1    Dec. 17, 2015

(30) Foreign Application Priority Data

Jun. 13, 2014  (DE) ......................... 10 2014 008 656

(51) Int. Cl.
| | | |
|---|---|---|
| H02J 7/00 | (2006.01) | |
| G06F 1/26 | (2006.01) | |
| G06F 1/32 | (2006.01) | |

(52) U.S. Cl.
CPC ............ *H02J 7/0063* (2013.01); *G06F 1/26* (2013.01); *G06F 1/3206* (2013.01); *G06F 1/3212* (2013.01); *H02J 7/0047* (2013.01); *H02J 2007/005* (2013.01); *H02J 2007/0067* (2013.01)

(58) Field of Classification Search
CPC ....................................................... H02J 7/00
See application file for complete search history.

(56) References Cited

U.S. PATENT DOCUMENTS

| | | | |
|---|---|---|---|
| 6,222,346 B1 | 4/2001 | Mori | |
| 6,388,426 B1 | 5/2002 | Yokoo et al. | |
| 2002/0140399 A1 | 10/2002 | Echarri et al. | |
| 2003/0096158 A1 | 5/2003 | Takano et al. | |
| 2004/0167741 A1 | 8/2004 | Iwaizono | |
| 2004/0212350 A1 | 10/2004 | Patino et al. | |
| 2010/0277128 A1 | 11/2010 | Tam et al. | |
| 2013/0278204 A1* | 10/2013 | Howard ................ | H02J 7/0054 320/107 |
| 2014/0068288 A1* | 3/2014 | Robinson .......... | H04W 52/0261 713/320 |

FOREIGN PATENT DOCUMENTS

| | | |
|---|---|---|
| DE | 10 2005 020 835 A1 | 3/2006 |
| EP | 2 061 129 A1 | 5/2009 |
| GB | 2 399 701 A | 9/2004 |
| WO | WO 01/39351 A2 | 5/2001 |

* cited by examiner

*Primary Examiner* — Michael T Vu
(74) *Attorney, Agent, or Firm* — Tarolli, Sundheim, Covell & Tummino LLP (57) ABSTRACT

A method for discharging a rechargeable battery of a mobile terminal is described, wherein the terminal has a processor system. The method comprises the steps of determining a charge status of the rechargeable battery, comparing the charge status with a threshold value and, if the charge status exceeds the threshold value, discharging the rechargeable battery by increasing the energy consumption of the processor system. A computer program product for executing the process, a mobile terminal and a motor vehicle which comprises the described mobile terminal, are moreover described.

21 Claims, 8 Drawing Sheets

MOBILE TERMINAL WITH A RECHARGEABLE BATTERY AND METHOD FOR DISCHARGING THE RECHARGEABLE BATTERY

RELATED APPLICATIONS

The present invention claims priority to German Patent Application Serial No. 10 2014 008 656.9, filed on 13 Jun. 2014; the entirety of which is incorporated herein by reference.

TECHNICAL FIELD

The present disclosure relates in general to the technical field of mobile terminals, for example for use in a motor vehicle. It relates in particular to a method for discharging a rechargeable battery of a mobile terminal.

BACKGROUND

The energy requirement of mobile terminals has increased continuously in recent years. This increase is attributed to an enhanced functionality of the mobile terminals and a greater processing power of the processors integrated therein. Owing to the increased energy requirement, rechargeable batteries are required which have a high charge storage capacity to enable a long operating time of the mobile terminals. Lithium-ion batteries, for example, have hitherto been used for this purpose.

Mobile terminals are often exposed to high ambient temperatures, particularly when used in a motor vehicle. However, high ambient temperatures are damaging to the rechargeable batteries of the mobile terminals. Resultant effects are, for example, instabilities in the output voltage and a reduction in the charge storage capacity. With this, the rechargeable batteries exhibit greater sensitivity to high ambient temperatures when they are fully charged.

To reduce the described impairment of the rechargeable battery at high ambient temperatures, it is proposed that the charge status of the rechargeable battery be limited to a fixed percentage (e.g. 75%) of the charge storage capacity. However, this means that the charge storage capacity cannot be fully utilised generally, i.e. also in the case of a low ambient temperature.

As an alternative to fixing the limit of the charge status of the rechargeable battery, European patent application EP 2 061 129 A1 describes a special discharge circuit. The discharge circuit forms an additional hardware component, which is integrated in the housing of a lithium-ion battery. Under certain criteria, such as when a critical ambient temperature is reached, the lithium-ion battery is automatically discharged up to a predetermined charge status. The discharge and the associated generation of heat take place here in the immediate vicinity of the cells of the rechargeable battery.

Similar principles are described in US patent applications US 2004/0167741 A1 and U.S. Pat. No. 6,222,346 B1, which provide circuits for regulating or limiting the charge status of a rechargeable battery according to temperature.

SUMMARY

The object is to provide an improved solution for discharging a rechargeable battery when this is integrated in a mobile terminal.

According to a first aspect, a method for discharging a rechargeable battery of a mobile terminal is described, wherein the mobile terminal has a processor system. The method comprises the steps of determining a charge status of the rechargeable battery, comparing the charge status with a first threshold value and, if the charge status exceeds the first threshold value, discharging the rechargeable battery by increasing the energy consumption of the processor system.

The first threshold value can be defined as a fixed value, such as a fixed percentage of the charge storage capacity of the rechargeable battery, or as a variable value. Therefore, the first threshold value can be varied depending on an ambient temperature of the mobile terminal or another parameter.

Provision can furthermore be made for the mobile terminal to have a cooling device which is associated with the processor system and for a heat emission of the processor system, which is increased as a result of the increase in the energy consumption of the processor system, to be dissipated by the cooling device. The cooling device can be for example a passive cooling device or an active cooling device. The passive cooling device can have at least one cooling element which can be constructed for example as a block of metal with good heat conductivity or as a metal plate. The active cooling device can comprise a fan and, optionally, also the passive cooling device.

To increase the energy consumption of the processor system, provision can be made to increase a clock rate of the processor system. Alternatively or additionally to this, the processor system can execute a dummy routine (e.g. a computationally intensive task) to increase the energy consumption.

In terms of discharging the rechargeable battery, provision can be made for the discharge to take place up to a second threshold value. The second threshold value can be defined as a fixed value or as a variable value. The second threshold value here can correspond to the first threshold value or a percentage of the first threshold value (or it can be different therefrom).

Provision can be made so that, if the particular charge status falls below the first threshold value, a recharging of the rechargeable battery is limited to a third threshold value. The third threshold value can correspond to the first threshold value and/or the second threshold value or the charge storage capacity of the rechargeable battery (or it can be different therefrom).

The method can moreover comprise the step of activating the processor system from a deactivated state. The deactivated state here can be a standby mode, an idle mode, a shutdown mode or a comparable mode with a reduced power consumption or separate power supply of the processor system.

The processor system can be activated, for example, automatically by a power supply system integrated in the mobile terminal or manually by actuating a mechanical operating element of the mobile terminal. The automated activation can take place once or repeatedly. A repeated activation of the processor system can be instigated for example at predetermined time intervals. Provision can furthermore be made to activate the processor system based on an ambient temperature of the mobile terminal.

At least one of the steps of determining the charge status of the rechargeable battery and comparing the charge status with the first threshold value can be carried out after the processor system is activated or before the processor system is deactivated. In the second case, provision can furthermore be made so that, before the processor system is deactivated, a limit value for an ambient temperature of the mobile terminal is specified which can be defined as a fixed value, which can be between 40° C. and 80° C. (e.g. 50° C.), or as a variable value (e.g. depending on the current charge status of the rechargeable battery and/or on the current geographical position). Additionally or alternatively to this, provision can be made so that, with the activation, the processor system receives information relating to the purpose of the activation (e.g. in that the activation takes place automatically for the purpose of discharging the rechargeable battery or is attributed to a manual actuation of a mechanical operating element).

The method can furthermore comprise the step of determining at least one parameter, with the at least one parameter indicating the ambient temperature of the mobile terminal. At least one of the steps of activating the processor system, determining the charge status of the rechargeable battery, comparing the charge status and discharging the rechargeable battery can be carried out depending on the parameter indicating the ambient temperature. Provision can therefore be made, for example, to activate the processor system if the parameter indicates a high ambient temperature of the mobile terminal which can result in impairments of the rechargeable battery if the charge status is greater than the first threshold value. The first threshold value can further be determined depending on the particular parameter of the mobile terminal (or independently thereof). In this case, different threshold values can be associated with different parameter values.

The at least one parameter can be selected from the ambient temperature, a geographical position of the mobile terminal, a time of year and a time of day. A prediction of the at least one parameter can furthermore be provided by a system profile.

At least one of the steps of the discharge method can be carried out by the processor system of the mobile terminal. The processor system here can comprise a processor which is integrated as standard in the mobile terminal, for example the main processor (central processing unit, CPU), the graphics processor (graphics processing unit, GPU) or both, to carry out at least one method step (for example to increase the energy consumption). The processor system can further comprise a memory and be designed to execute at least one computer program product stored on the memory for the purpose of carrying out the process.

According to a second aspect, a computer program product is provided, which is stored on a computer-readable memory. The computer program product is functionally capable of prompting a mobile terminal to execute the method according to the first aspect.

According to a third aspect, a mobile terminal is provided. The mobile terminal comprises a rechargeable battery and a processor system which is designed to determine a charge status of the rechargeable battery, to compare the charge status with a threshold value and, if the charge status exceeds the threshold value, to increase the energy consumption to discharge the rechargeable battery.

The rechargeable battery can be a lithium-ion battery or another rechargeable battery which is suitable for integration in a mobile terminal. The mobile terminal can comprise an interface which is designed to charge the rechargeable battery. The interface for charging the rechargeable battery can be designed as a wired connection, as an electrical contact with a plug connection or for inductive energy transfer.

The processor system of the mobile terminal can further be designed to determine at least one parameter which indicates an ambient temperature of the mobile terminal.

The mobile terminal can further comprise a communication device which is designed for communication with a system function arranged outside the mobile terminal. The system function can belong for example to a motor vehicle (motor vehicle function) or to another system. The communication here can be effected via a wired connection, for example via USB or UART, or wirelessly, for example via Bluetooth, WLAN, ultra broadband or another wireless connection. Furthermore, a wired communication of the mobile terminal with one system function and a wireless communication with another system function can, for example, also be provided. The system function can be selected from a temperature sensor function, a system clock function and an infotainment function. The infotainment function can comprise for example a position-determining function, a music player function or a telephony function.

The mobile terminal can further comprise a power supply system which is designed to activate the processor system from a deactivated state. The power supply system can have a charge circuit which is connected for example to a rechargeable battery of the mobile terminal and/or an external power supply. Additionally or complementary to this, the power supply system can have a regulating module which provides, for example, a supply voltage required by the processor system.

The mobile terminal can moreover have a control device which is designed to determine at least one parameter which indicates an ambient temperature of the mobile terminal and, based on the parameter, to transmit a control signal to at least one of the processor system and the power supply system. The control device can comprise for example a temperature sensor and/or be designed for communication with at least one system function.

Provision can be made for the mobile terminal to be a tablet PC or a smartphone.

According to a fourth aspect, a motor vehicle is presented which comprises the mobile terminal presented here. The motor vehicle can further comprise a holding device for releasably holding the mobile terminal. The mobile terminal can be used for example in a state in which it is released from the holding device and in a state in which it is mounted on the holding device. Provision can be made for the mobile terminal to be designed as a control device for a motor vehicle function. The controlled motor vehicle function can be selected for example from an infotainment function, a climate control function, a seat function, a wing-mirror function and a power window function.

The motor vehicle can further comprise an interface which is designed for charging the rechargeable battery of the mobile terminal. Further interfaces, which are designed for example for communication with the mobile terminal, can be provided in the motor vehicle.

BRIEF DESCRIPTION OF THE DRAWINGS

Further advantages, details and features of the solution described here are revealed in the description below of exemplary embodiments and in the Figures, which show.

DETAILED DESCRIPTION

Figure 1A:
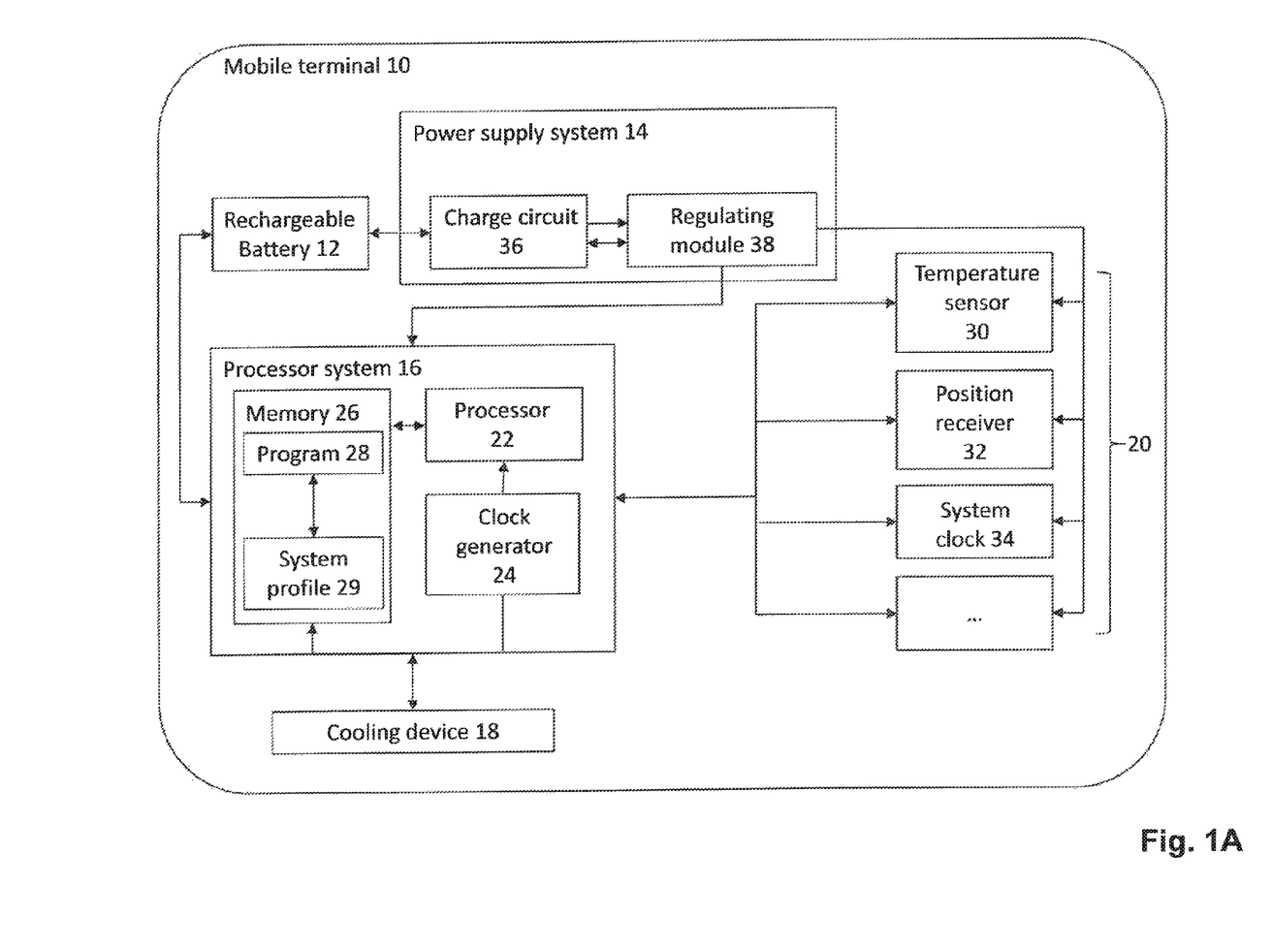
FIGS. 1A and 1B schematic illustrations of exemplary embodiments of a mobile terminal.

FIG. 1A shows, in a block diagram, an exemplary embodiment of a mobile terminal which is denoted as a whole by 10. This can be for example a tablet PC, a smartphone or another mobile terminal 10.

The mobile terminal 10 comprises a rechargeable battery 12, a power supply system 14, a processor system 16, a cooling device 18 and system functions 20. The energy supply of the processor system 16 is provided by way of the power supply system 14 from the rechargeable battery 12 which is arranged spatially removed from the processor system 16. A lithium-ion battery 12 is provided here in the exemplary embodiment shown. In other exemplary embodiments, other batteries 12 which are suitable for integration in mobile terminals can be used, for example nickel metal hydride batteries.

The heat of the processor system 16 which is emitted during operation of the processor system 16 is dissipated by the cooling device 18. The cooling device 18 here can be for example an active or a passive cooling device 18, as is associated as standard with the processor system 16.

The processor system 16 comprises at least one processor 22, a clock generator 24 and a memory 26. In the exemplary embodiment shown, the processor 22 is the main processor (CPU). In another exemplary embodiment, the processor system 16 shown can additionally comprise another processor, such as a graphics processor (GPU). The clock generator 24 is designed to generate the reference clock of the processor 22 and the memory 26. The memory 26 is further designed to store data and at least one computer program product (program) 28. The memory 26 can further be designed to store a system profile 29. The memory 26 can be for example a hard disk storage, a removable storage or a solid state storage.

On the basis of stored parameters of the system functions 20, the system profile 29 is able to provide the processor system 16 with predictions about the parameters. Therefore, based on the system profile 29, a program 28 which is stored in the memory 26 can be accessed (for example to implement an increase in the energy consumption of the processor system 16) when the predictions indicate an imminent high ambient temperature of the mobile terminal 10. The system profile 29 itself, or part of this, can also be stored as a program 28 in the memory 26.

The processor system 16 is connected to the rechargeable battery 12 and the system functions 20 for example via communication lines (e.g. an I2C or other bus system) which are implemented in the mobile terminal 10. The system functions 20 comprise for example a temperature sensor 30 for detecting the ambient temperature, a position receiver 32 for detecting the position of the mobile terminal 10 (e.g. GPS receiver) and a system clock 34 for determining the time of day and the date. In the exemplary embodiment shown, the parameters determined by the system functions 20 are selected such that they indicate an ambient temperature of the mobile terminal 10. However, the selection of parameters can be combined and expanded as required. The processor system 16 is further designed to determine the charge status of the rechargeable battery 12 and to read out and process the parameters detected by the system functions 20.

The power supply system 14 comprises a charge circuit 36 and a regulating module 38. The charge circuit 36 is designed to control the charge procedure of the rechargeable battery 12 and for the power supply of the regulating module 38 by means of the rechargeable battery 12. The regulating module 38 is further designed to generate the supply voltage of the processor system 16, the system functions and alternative or complementary components of the mobile terminal 10. A communication between the regulating module 38 and the charge circuit 36 can furthermore be provided for example to detect and control a charge storage.

Figure 1B:
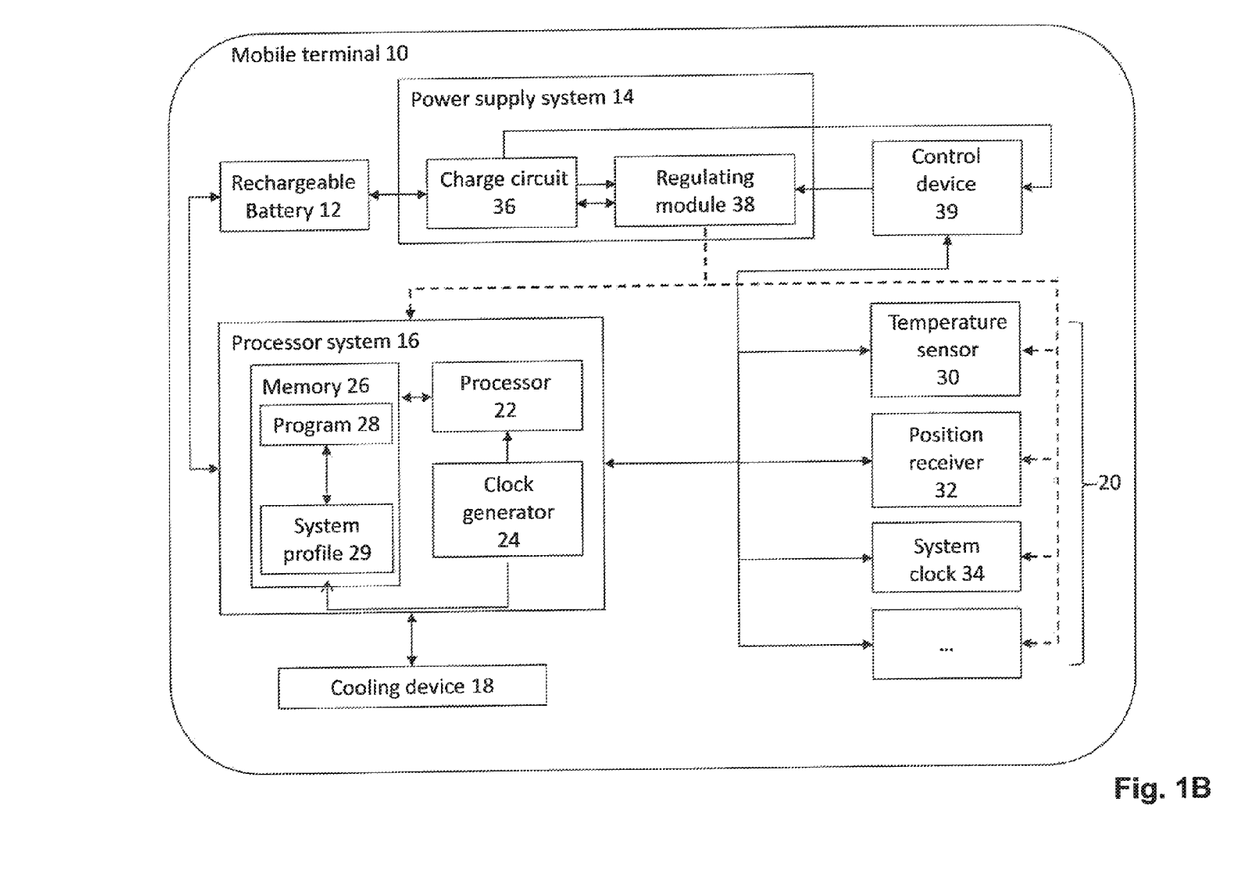

In addition to the exemplary embodiment shown in FIG. 1A, the mobile terminal 10 according to FIG. 1B comprises a control device 39. The control device 39 is designed to transmit a control signal to the regulating module 38. By means of the control signal, the control device 39 can prompt the regulating module 38 to activate the power supply of the processor system 16 and the system functions 20 (denoted by the dashed lines characterised by small line segments). In another exemplary embodiment, the power supply of at least one system function 20 can be independent of the control device 39.

The control device 39 can further determine at least one parameter (and possibly evaluate this, for example using a threshold-value judgement) which indicates an ambient temperature of the mobile terminal 10. The control device 39 here can comprise for example a temperature sensor 30 or be designed for communication with at least one of the system functions 20 and/or the system profile 29. Alternatively or in addition to this, a communication between the processor system 16 and control device 39 can be provided, for example to transmit the parameters determined by the control device 39 to the system profile 29.

Provision can furthermore be made for the control device 39 to transmit the control signal once or repeatedly to the regulating module 38. A repeated transmission can take place for example at predetermined time intervals. Alternatively or in addition to this, a (possibly repeated) transmission can take place depending on the at least one parameter indicating the ambient temperature.

Figure 2A:
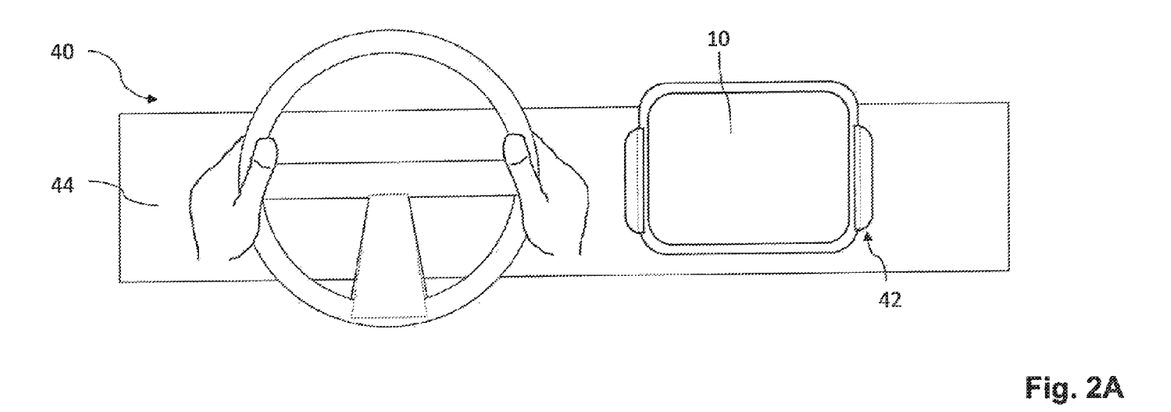
FIGS. 2A and 2B schematic illustrations of exemplary embodiments for using a mobile terminal in a motor vehicle and a holding device for releasably holding the mobile terminal.
Figure 2B:
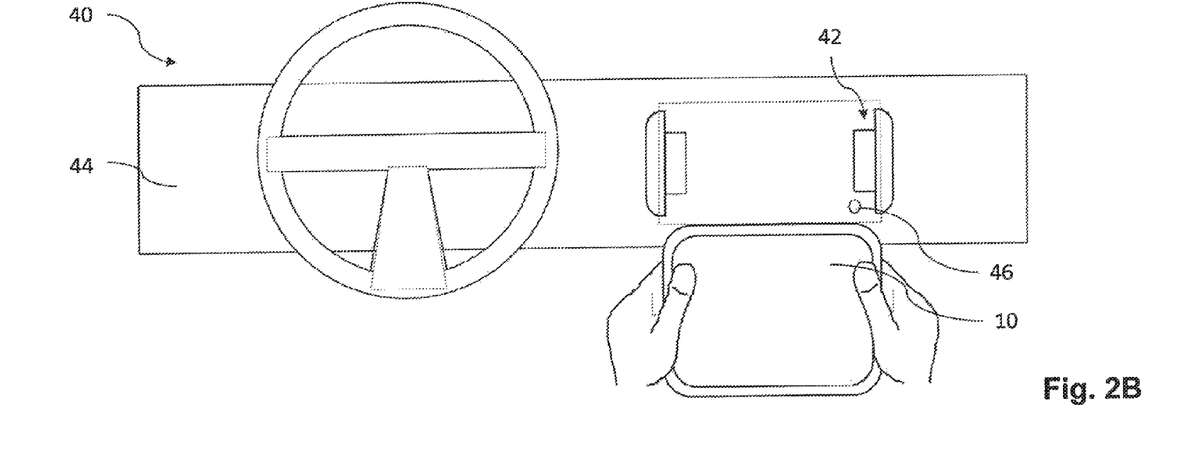

FIGS. 2A and 2B show exemplary embodiments for using a mobile terminal 10 in a motor vehicle 40 and a holding device 42 for releasably holding the mobile terminal 10. FIGS. 2A and 2B here show a front view of the dashboard 44 of the motor vehicle 40, with the mobile terminal 10 being in a state in which it is mounted in the holding device 42 in FIG. 2A and in a state in which it is released from the holding device 42 in FIG. 2B. The mobile terminal 10 according to FIGS. 2A and 2B can have the configuration described with reference to FIG. 1 or it can be configured in another way.

In the exemplary embodiments shown in FIGS. 2A and 2B, the holding device 42 comprises a latching mechanism which is in engagement with side regions of the mobile terminal 10. In other exemplary embodiments, the holding device 42 can comprise another type of latching mechanism or another fastening solution for holding the mobile terminal 10. The holding device 42 is furthermore mounted on the dashboard 44 in the region of the central console of the motor vehicle 40. Alternatively to this, the holding device 42 can be mounted at other points in the motor vehicle 40 or integrated in components of the motor vehicle 40, such as the centre console.

As shown in FIG. 2B, the motor vehicle 40 further comprises a power supply interface 46 which is designed to charge the rechargeable battery 12 (not shown) of the mobile terminal 10. The power supply interface 46 is connected to the vehicle electrical system of the motor vehicle 40. In the exemplary embodiment shown, the power supply interface 46 is an electrical plug connection. However, this can alternatively also be designed as a wireless (e.g. inductive) connection. A complementary power supply interface (not shown) can be arranged for example on the rear of the mobile terminal 10. In other exemplary embodiments, the power supply interface 46 can be arranged on another part of the motor vehicle 40 or be dispensed with entirely. The motor vehicle 40 can further comprise alternative or additional interfaces, for example for communication with the mobile terminal 10.

Figure 3:
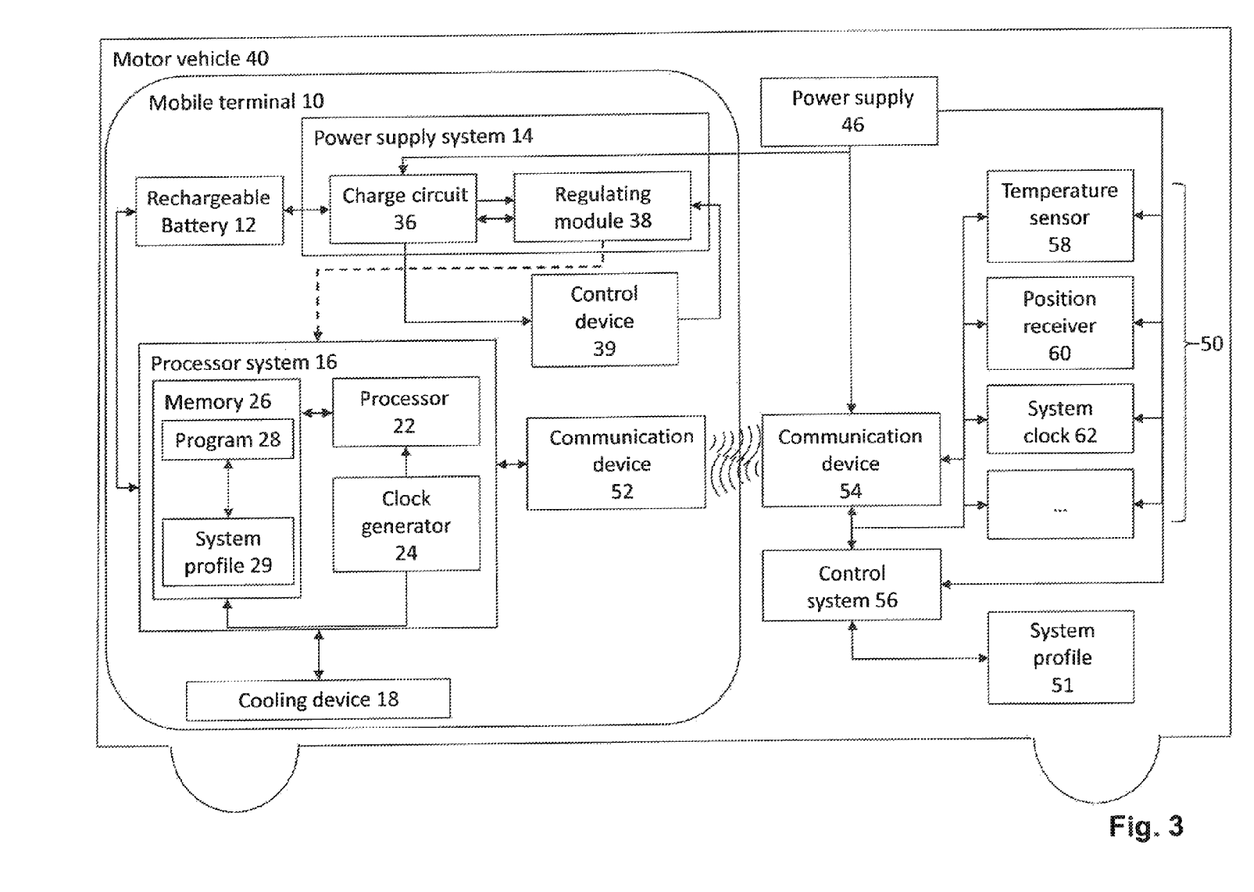
FIG. 3 a schematic illustration of an exemplary embodiment of a mobile terminal for communication with system functions of a motor vehicle.

FIG. 3 shows, in a block diagram, an exemplary embodiment of a mobile terminal 10 for communication with system functions 50 and a system profile 51 (e.g. similar to the system profile 29) of a motor vehicle 40. This can be the mobile terminal 10 which is explained with reference to FIGS. 2A and 2B.

Additionally or alternatively to the exemplary embodiment shown in FIG. 1B, the mobile terminal 10 according to FIG. 3 comprises a communication device 52. The processor system 16 of the mobile terminal 10 is designed to control the communication device 52. The communication device 52 of the mobile terminal 10 communicates with a complementary communication device 54 arranged in the motor vehicle 40 by means of uni- or bi-directional data transfer. In the present exemplary embodiment, the data transfer takes place bi-directionally and wirelessly, for example via Bluetooth or WLAN or ultra broadband. In another exemplary embodiment, the data transfer can also take place via a wired connection (e.g. via USB, UART, CAN or via various bus systems).

The communication device 54 of the motor vehicle 40 is coupled to the motor vehicle system functions 50 and to a control system 56 which communicates with the system profile 51. The system functions 50 comprise for example a temperature sensor function 58, a position receiver function 60 and a system clock function. The selection of system functions 50 can be combined and expanded as required. In the exemplary embodiment shown, the processor system 16 is designed to determine at least one parameter by way of the communication with the system functions 50 and the system profile 51, which parameter indicates an ambient temperature of the mobile terminal 10 in the motor vehicle 40 (e.g. temperature or time of day).

The processor system 16 of the mobile terminal 10 is further designed to control one or more motor vehicle functions by way of the control system 56 of the motor vehicle 40. The controllable motor vehicle functions comprise for example the above-mentioned system functions 50 and infotainment functions, such as music, telephony, video telephony or navigation. The navigation function here can include the position receiver function 60. Further motor vehicle functions which can be controlled by means of the mobile terminal 10 are, for example, settings for the climate control, the seat alignment, the heated seats, the alignment of the wing mirrors or the power windows.

In another exemplary embodiment, the control device 39 can be designed to communicate with at least one of the system functions 50 and/or the system profile 51 of the motor vehicle 40 by way of the communication device 52 according to the exemplary embodiment shown in FIG. 3 or an alternative or additional communication device of the mobile terminal 10.

Figure 4A:
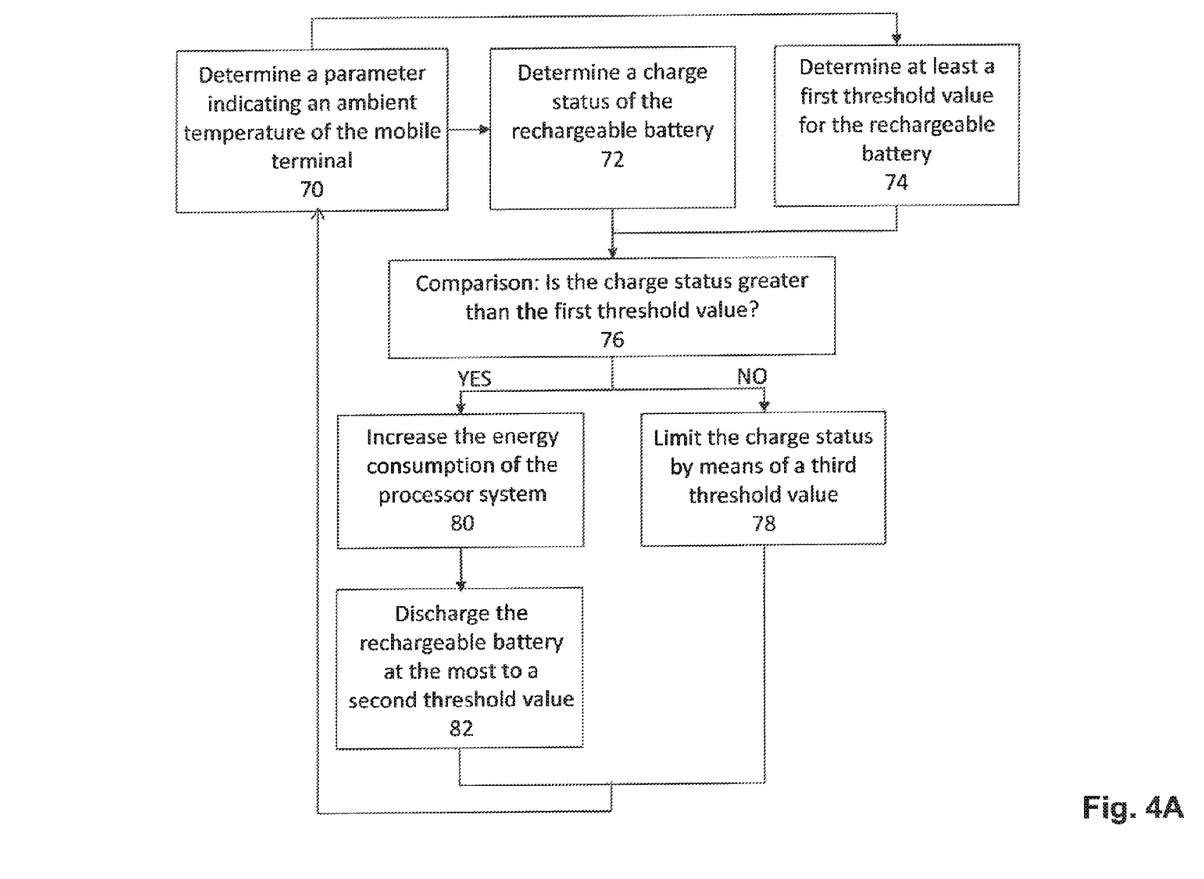
FIGS. 4A to 4C flow charts of exemplary embodiments of a method for discharging a rechargeable battery of a mobile terminal.
Figure 4B:
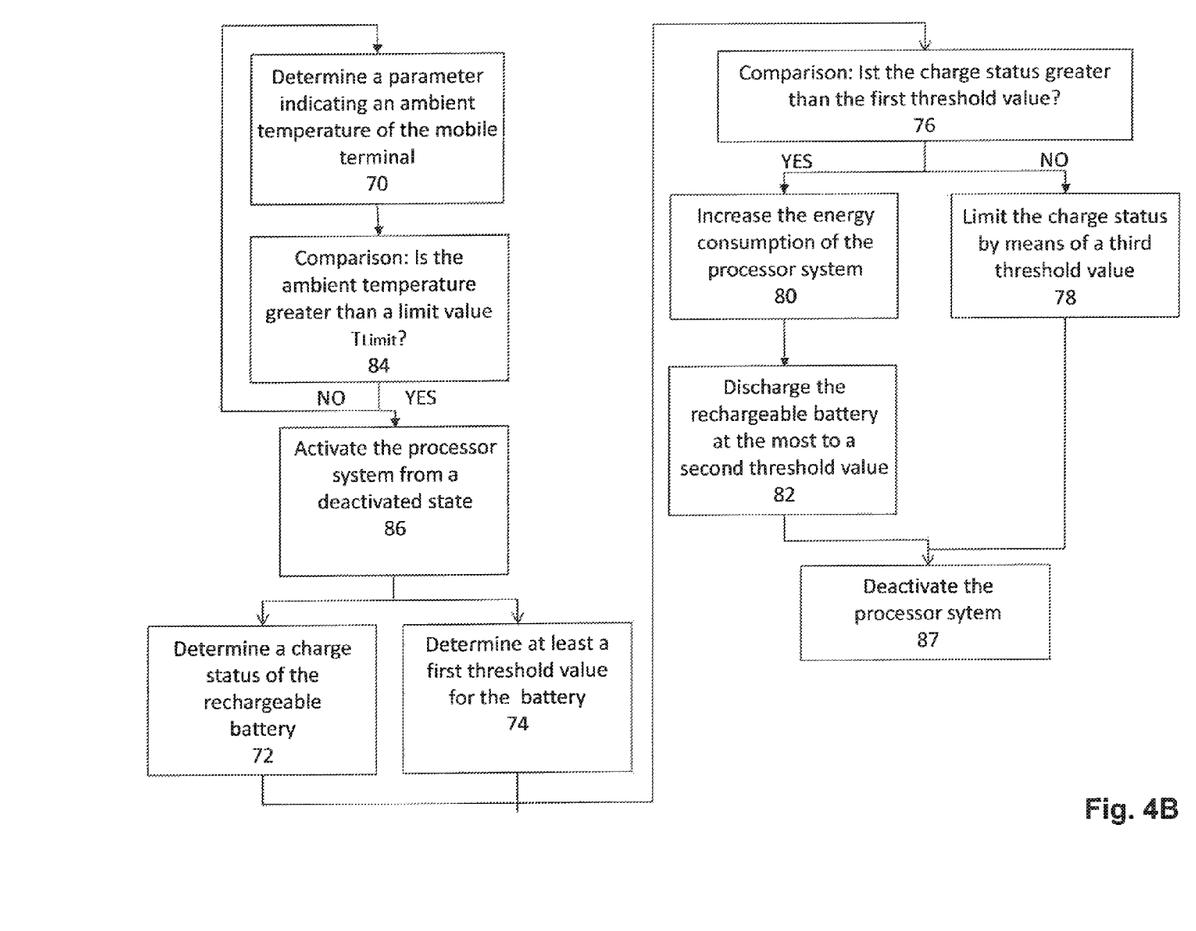
Figure 4C:
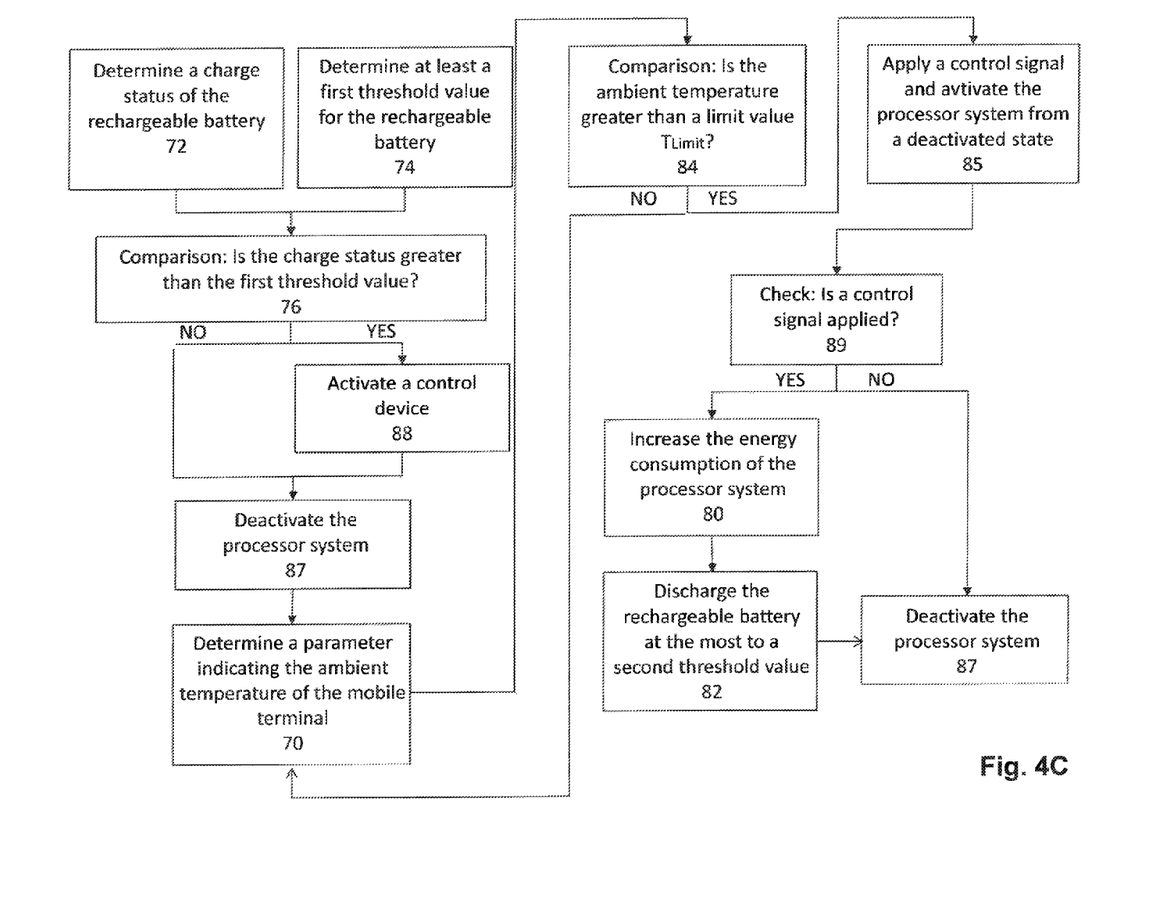

FIGS. 4A to 4C show flow charts of exemplary embodiments of a method for discharging a rechargeable battery 12 of the mobile terminal 10 according to FIG. 1A, 1B, 2A, 2B or 3. The method can be provided for implementation by a mobile terminal 10 in a motor vehicle 40. The mobile terminal 10 can be arranged mounted on the holding device 42 or released from the holding device 42 (for example on the passenger seat or in the glove compartment of the motor vehicle 40). High ambient temperatures in the motor vehicle 40 can lead to impairments of the rechargeable battery 12 when the rechargeable battery 12 of the mobile terminal 10 has a high charge status.

According to the exemplary embodiment in FIG. 4A, a parameter indicating an ambient temperature of the mobile terminal 10 is determined in a first method step 70. With reference to the exemplary embodiments in FIGS. 1A, 1B and 3, the parameter is read out for example from the system functions 20 of the mobile terminal 10 by the active processor system 16, determined by a communication with a system function 50 of the motor vehicle 40 or provided by the system profile 29, 51 of the mobile terminal 10 or the motor vehicle 40. In another exemplary embodiment, the parameter can be determined in another way or from a combination of a plurality of parameters, or it is possible to dispense with determining the parameter entirely. In the latter case, the further steps can be carried out irrespective of the ambient temperature.

In two further steps 72 and 74, a charge status of the rechargeable battery 12 and a first threshold value for the rechargeable battery 12 are determined depending on the particular parameter. Provision can therefore be made, for example, to determine the charge status of the rechargeable battery 12 and the first threshold value if the parameter indicates a high ambient temperature of the mobile terminal 10, which can lead to impairments of the rechargeable battery 12 when a charge status exceeds the first threshold value. Provision can further be made for only the charge status or the first threshold value to be determined depending on the particular parameter of the mobile terminal 10 (or both can be determined independently of one another).

In a subsequent method step 76, the charge status is compared with the first threshold value. With reference to the exemplary embodiments of FIGS. 1A, 1B and 3, provision is made for the steps described to be carried out for example by the processor system 16. Furthermore, if the charge status falls below the first threshold value, the charge status of the rechargeable battery 12 is limited to a third threshold value in a charge procedure in a subsequent method step 78.

If the charge status exceeds the first threshold value, the energy consumption of the processor system 16 of the mobile terminal 10 is increased in a further step 80 following the method step 76. With reference to the exemplary embodiments in FIGS. 1A, 1B and 3, provision is made here to increase the clock rate of the processor system 16. For example, a reference clock rate, generated by the clock generator 24, or a clock multiplier of the processor 22 can be increased. Alternatively or additionally to this, the execution of a dummy routine (e.g. a computationally intensive task) can be provided by the processor system 16. To this end, the processor system 16 can be activated from a deactivated state.

As a result of the increased energy consumption of the processor system 16, the rechargeable battery 12 of the mobile terminal 10 is discharged at the most to a second threshold value in step 82. This discharge results in a higher heat emission of the processor system 16. The heat can be dissipated such that it is spatially removed from the cells of the rechargeable battery 12 by the cooling device 18 associated with the processor system 16 (cf. the exemplary embodiments according to FIGS. 1A, 1B and 3).

According to the exemplary embodiment in FIG. 4B, a parameter indicating an ambient temperature of the mobile terminal 10 is determined in a first method step 70. With reference to the exemplary embodiments in FIGS. 1B and 3, the parameter can be determined by the control device 39 irrespective of the activation state of the processor system 16. For example, the processor system 16 can be in a deactivated state.

In a second method step 84, the ambient temperature is compared with a threshold value $T_{Limit}$. The limit value here can correspond, for example, to an ambient temperature of the mobile terminal 10 which can lead to impairments of the rechargeable battery 12 when a charge status exceeds the first threshold value. Alternatively to this, the limit value can correspond to an ambient temperature which deviates from this (for example a lower ambient temperature). With reference to the exemplary embodiments in FIGS. 1B and 3, the control device 39 can be designed to carry out the comparison (step 84) and, if the ambient temperature falls below the limit value, repeat the determination of the ambient temperature (step 70) at a later point in time. The limit value can generally correspond to a temperature between 40° C. and 80° C. (e.g. approximately 50° C.).

If the ambient temperature exceeds the limit value (or corresponds to the limit value) the processor system 16 is activated from a deactivated state in a further step 86. The processor system 16 can be activated by means of a control signal of the control device 39, whereupon the regulating module 38 is prompted to activate the power supply of the processor system 16 (cf. the exemplary embodiments according to FIGS. 1B and 3.

Following the activation of the processor system 16, the steps according to the exemplary embodiment in FIG. 4A can be implemented. Alternatively to this, in the exemplary embodiment shown in FIG. 4B, a charge status of the rechargeable battery 12 (step 72) and a first threshold value for the rechargeable battery 12 (step 74) are determined without again determining the ambient temperature (step 70). Provision can be made here, for example, for the control device 39 according to the exemplary embodiments of FIGS. 1B and 3 to be connected by way of a communication line to the processor system 16 for transmitting the parameter indicating an ambient temperature.

As an alternative to this, provision can be made for the processor system 16 to be in an activated state at any time. In this case, the steps 72 to 82 can furthermore be carried out following the comparison of the ambient temperature with the limit value (step 84).

In a final method step 87, the processor system 16 is deactivated. The deactivation can take place for example in order to switch off the mobile terminal 10 (e.g. upon a user input), to save power (e.g. automatically) or to take the load off the system processor 16.

FIG. 4C shows a further exemplary embodiment of a method for discharging a rechargeable battery 12 of the mobile terminal 10 according to FIGS. 1B and 3. In this, the steps of determining a charge status (step 72), determining at least a first threshold value (step 74) and comparing the charge status with the first threshold value (step 76) are firstly carried out for example by the activated processor system 16.

If the charge status of the rechargeable battery 12 exceeds the first threshold value, a control device 39 is activated in a further method step 88 between the comparison of the charge state (step 76) and a deactivation of the processor system 16 (step 87). In another exemplary embodiment, provision can be made to activate the control device 39 without carrying out the determination of the charge status (step 72), the determination of the threshold value (74) and/or the comparison (step 76). The activation of the control device 39 can particularly comprise an activation of a temperature sensor function of the control device 39.

With reference to the exemplary embodiments in FIGS. 1B, 3 and 4B, the control device 39 is designed to determine the parameter indicating an ambient temperature (step 70), to compare the ambient temperature with the limit value (step 84) and, in the event of an ambient temperature which exceeds the limit value, to prompt the activation of the processor system 16.

In the method step 85, the control device 39 accordingly applies a control signal (wake-up) to the power supply system 14, which then activates the processor system 16 from its deactivated state. Provision can be made here for the control device 39 to apply the control signal on a line which is also interrogated by the processor system 16 upon start-up (booting) or thereafter (the control device 39 can therefore be coupled to the processor system). A further method step 89 checks whether a control signal has been applied. With reference to the exemplary embodiments in FIGS. 1B and 3, provision can be made here to design the activated processor system 16 to increase the energy consumption as a result of an applied control signal (step 80) so that the rechargeable battery 12 of the mobile terminal 10 is discharged at the most to a second threshold value (step 82). It is possible to execute a dummy routine for this purpose, as described above. On the other hand, if no control signal is detected by the processor system 16 (for example because the activation takes place upon a user command) a conventional booting process takes place.

The processor system 16 is deactivated in a further method step 87. Provision can furthermore be made for the deactivation of the processor system 16 (step 87) to follow the check (step 89) immediately if no control signal is applied. In another embodiment, provision can further be made to set a flag as an alternative to applying the control signal (step 85). This can be a charge status indicator which is provided for the processor system 16 and indicates for example that the processor system 16 is activated as a result of high ambient temperatures.

In addition, at least one of the steps 82 and 89 can be followed by the implementation of the method for discharging a rechargeable battery 12 of the mobile terminal 10 according to FIG. 4A.

Figure 5:
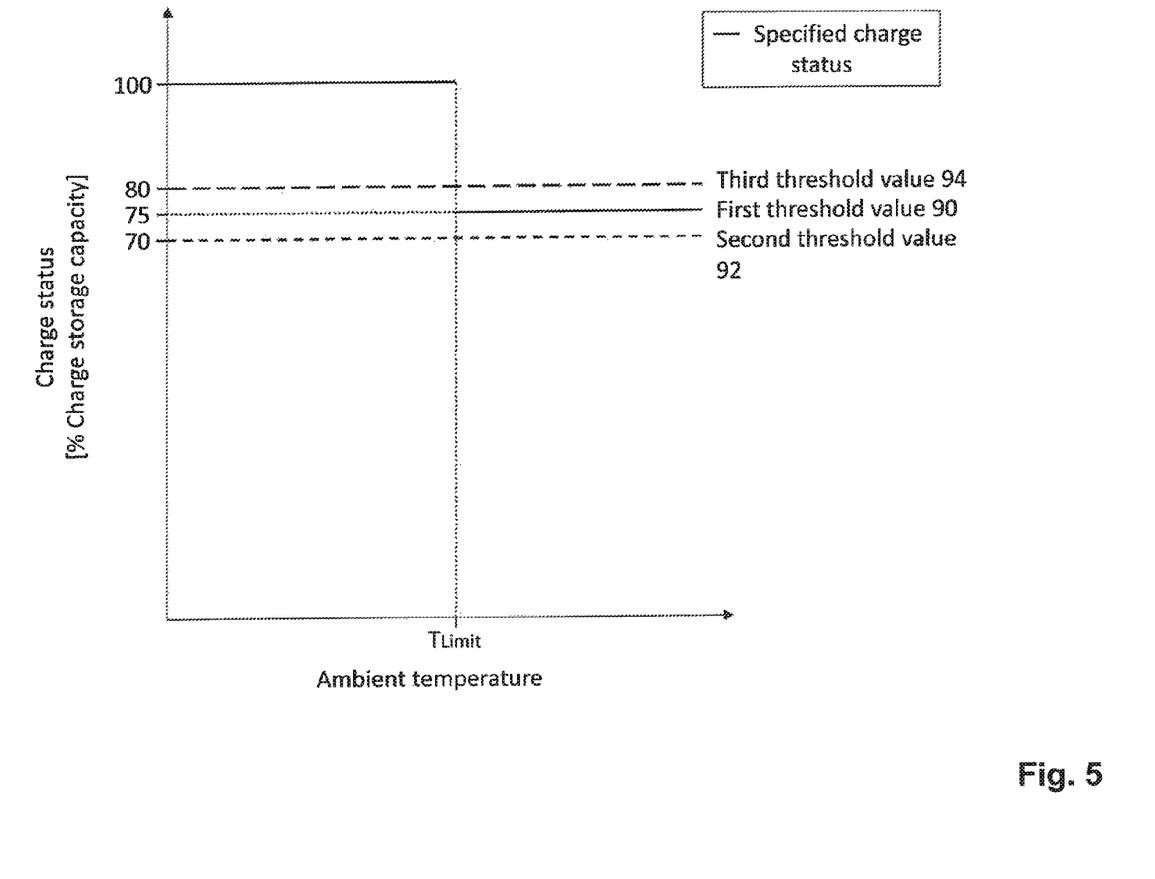
FIG. 5 a graph for explaining an exemplary link between a charge status of a rechargeable battery and an ambient temperature of a mobile terminal.

The graph according to FIG. 5 shows an exemplary connection between a charge status (as a percentage of a charge storage capacity) of the rechargeable battery 12 and the ambient temperature of a mobile terminal 10. The continuous line here denotes a specified charge status and the first threshold value 90, the dashed line characterised by short line segments denotes the second threshold value 92 and the dashed line characterised by long line segments denotes the third threshold value 94.

In the exemplary embodiment shown, the specified charge status of the rechargeable battery 12 of the mobile terminal 10 corresponds to 100% of the charge storage capacity of the rechargeable battery 12 under normal conditions with reference to the exemplary embodiments of FIGS. 1A to 3. In other embodiments, the specified charge status can be other than 100%.

In the event of high ambient temperatures (e.g. $\geq T_{Limit}$) of the mobile terminal 10, the specified charge status is reduced to the first threshold value 90 at 75% of the charge storage capacity. With reference to the method according to FIG. 4, for example, provision can be made for the further method steps to be carried out if the parameter indicating an ambient temperature (step 70) indicates an ambient temperature which exceeds the limit value. The charge status of the rechargeable battery can be compared here to the first threshold value 90 in step 76.

The second threshold value 92 at 70% and the third threshold value 94 at 80% of the charge storage capacity further define a tolerance range around the first threshold value 90 within which it is possible to reduce any impairment of the rechargeable battery 12 at high ambient temperatures. This can be the tolerance range which is taken into account according to FIG. 4 when the rechargeable battery 12 is discharged at the most to the second threshold value 90 (step 82) or, when limiting the charge procedure of the rechargeable battery 12 by means of the third threshold value 94 (step 78).

In other exemplary embodiments, the specified charge status can be an absolute voltage value, a charge storage capacity of the rechargeable battery 12, which is other than 75%, or a variable value which depends for example functionally or otherwise on the ambient temperature of the mobile terminal 10 (e.g. the higher the value T above the $T_{Limit}$, the lower the specified charge status). The first threshold value 90 can furthermore be the same as the specified charge status or different from this. The second 92 and the third 94 specified threshold value can define a greater or smaller tolerance or hysteresis range, be interchanged in terms of their value, correspond to a percentage or absolute deviation from the first threshold value 90 or be the same as the first threshold value 90. According to the exemplary embodiments in FIGS. 1A, 1B and 3, provision can be made for the processor system 16 of the mobile terminal 10 to determine the specified charge status as well as the first, second and third threshold value.

All in all, provision can be made to implement the method according to FIG. 4A for example automatically at predetermined time intervals. The mobile terminal 10 here can be automatically activated once or repeatedly from a deactivated state (e.g. standby mode) to implement the process. With reference to the exemplary embodiments shown in FIGS. 1A, 1B and 3, the method for discharging a rechargeable battery 12 of a mobile terminal 10 is carried out by the processor system 16. Core hardware, which is integrated as standard in a conventional mobile terminal 10, is used exclusively here. This offers the option of a pure software solution which can also be implemented subsequently in an existing mobile terminal 10.

When implementing the method according to FIGS. 4B and 4C, provision can be made to only activate the processor system 16 automatically when the ambient temperature of the mobile terminal 10 exceeds the limit value. This can save on power and relieve the load on the processor system 16 of the mobile terminal 10.

As a result of the slight changes in the composition of the hardware components, it is therefore possible in some implementations to avoid increasing the rechargeable battery 12 (for example through an additional discharge resistor on the rechargeable battery 12) and/or increasing the overall size of the entire mobile terminal 10.

Under normal conditions (e.g. at $T < T_{Limit}$), it is possible to make use of the full charge storage capacity of the rechargeable battery 12 of the mobile terminal 10 whilst enabling a reduction in the impairment of the rechargeable battery 12 of the mobile terminal 10 at high ambient temperatures.

The exemplary embodiments described present different features and applications of an approach to discharging a rechargeable battery of a mobile terminal. In a deviating exemplary embodiment, these features can, of course, also be combined as required.

What is claimed is:

1. A method for discharging a rechargeable battery of a mobile terminal, wherein the mobile terminal has a processor system, comprising the following steps performed by the processor system of the mobile terminal:
    determining at least one parameter which indicates an ambient temperature of the mobile terminal;
    determining a charge status of the rechargeable battery;
    comparing the charge status with a first threshold value; and
    if the charge status exceeds the first threshold value, discharging the rechargeable battery by increasing the energy consumption of the processor system;
    wherein at least one of the steps determining the charge status, comparing the charge status and discharging the rechargeable battery is carried out depending on the parameter indicating the ambient temperature.

2. The method for discharging a rechargeable battery according to claim 1, wherein the mobile terminal has a cooling device associated with the processor system, and wherein a heat emission of the processor system, which is increased by increasing the energy consumption of the processor system, is dissipated by the cooling device.

3. The method for discharging a rechargeable battery according to claim 1 wherein, to increase the energy consumption of the processor system, a clock rate of the processor system is increased and/or a dummy routine is executed by the processor system.

4. The method for discharging a rechargeable battery according to claim 1, wherein the rechargeable battery is discharged up to a second threshold value.

5. The method for discharging a rechargeable battery according to claim 1, wherein, if the charge status falls below the first threshold value, a recharging of the rechargeable battery is limited to a third threshold value.

6. The method for discharging a rechargeable battery according to claim 1, further comprising the step:
    activating the processor system from a deactivated state.

7. The method for discharging a rechargeable battery according to claim 6, wherein at least one of the steps for determining the charge status and comparing the charge status is carried out by the processor system after the processor system is activated or before the processor system is deactivated.

8. The method for discharging a rechargeable battery according to claim 6, wherein the step of activating the processor system is carried out depending on the parameter indicating the ambient temperature.

9. The method for discharging a rechargeable battery according to claim 1, further comprising the step: determining the first threshold value depending on the parameter indicating the ambient temperature.

10. The method for discharging a rechargeable battery according to claim 1, wherein the at least one parameter is selected from the ambient temperature, a geographical position of the mobile terminal, a time of day and a time of year.

11. A non-transitory computer readable-medium having instructions, that when executed by a processor system of a mobile terminal implement a method of claim 1.

12. A mobile terminal, comprising:
a rechargeable battery; and
a processor system which is designed to
determine at least one parameter which indicates an ambient temperature of the mobile terminal;
determine a charge status of the rechargeable battery;
compare the charge status with a threshold value; and
if the charge status exceeds the threshold value, increase the energy consumption to discharge the battery;
wherein the processor system is designed to carry out at least one of the steps of determining the charge status, comparing the charge status and discharging the rechargeable battery depending on the parameter indicating the ambient temperature.

13. The mobile terminal according to claim 12, wherein the rechargeable battery is a lithium-ion rechargeable battery.

14. The mobile terminal according to claim 12, wherein the processor system is further designed to determine at least one parameter which indicates an ambient temperature of the mobile terminal.

15. The mobile terminal according to claim 12, further comprising a communication device which is designed for communication with a system function arranged outside the mobile terminal.

16. The mobile terminal according to claim 15, wherein the system function is selected from a temperature-sensor function, a position receiver function and a system clock function.

17. The mobile terminal according to claim 12, further comprising: a power supply system which is designed to activate the processor system from a deactivated state.

18. The mobile terminal according to claim 17, further comprising:
a control device which is designed to determine at least one parameter which indicates an ambient temperature of the mobile terminal and to transmit a control signal to at least one of the processor system and the power supply system based on the parameter.

19. The mobile terminal according to claim 12, wherein the mobile terminal is a tablet PC or a smartphone.

20. The mobile terminal according to claim 12, wherein the mobile terminal is located within a motor vehicle, the motor vehicle comprising a holding device for releasably holding the mobile terminal.

21. The mobile terminal according to claim 20, wherein the motor vehicle further comprises an interface designed for charging the rechargeable battery of the mobile terminal.

* * * * *